(12) United States Patent
Tang et al.

(10) Patent No.: US 9,200,121 B2
(45) Date of Patent: Dec. 1, 2015

(54) THERMOSETTING POLY(SILOXANE-DIPHENYLBUTADIYNE) WITH READILY TUNABLE GLASS TRANSITION TEMPERATURE AND HIGH THERMAL STABILITY

(71) Applicant: THE HONG KONG UNIVERSITY OF SCIENCE AND TECHNOLOGY, Hong Kong (CN)

(72) Inventors: Benzhong Tang, Hong Kong (CN); Jie Li, Hong Kong (CN); Rongrong Hu, Hong Kong (CN); Wing Yip Lam, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 14/386,972

(22) PCT Filed: Apr. 7, 2013

(86) PCT No.: PCT/CN2013/000395
§ 371 (c)(1),
(2) Date: Sep. 22, 2014

(87) PCT Pub. No.: WO2013/152619
PCT Pub. Date: Oct. 17, 2013

(65) Prior Publication Data
US 2015/0057421 A1       Feb. 26, 2015

Related U.S. Application Data

(60) Provisional application No. 61/686,762, filed on Apr. 12, 2012.

(51) Int. Cl.
C08G 77/52       (2006.01)
C09J 183/14       (2006.01)

(52) U.S. Cl.
CPC ............... *C08G 77/52* (2013.01); *C09J 183/14* (2013.01)

(58) Field of Classification Search
None
See application file for complete search history.

(56) References Cited

U.S. PATENT DOCUMENTS

| 5,563,181 A | 10/1996 | Keller et al. |
|---|---|---|
| 5,874,514 A | 2/1999 | Keller et al. |
| 6,787,615 B2 | 9/2004 | Keller et al. |
| RE39,428 E | 12/2006 | Keller et al. |
| 7,153,921 B2 | 12/2006 | Keller et al. |
| 7,261,834 B2 | 8/2007 | Fuchs et al. |
| 7,341,283 B2 | 3/2008 | Moses et al. |
| 2010/0081137 A1* | 4/2010 | Carell et al. ............. 435/6 |

FOREIGN PATENT DOCUMENTS

| CN | 1865320 A | 11/2006 |
|---|---|---|
| CN | 101679616 A | 3/2010 |
| CN | 102020770 A | 4/2011 |
| JP | 2001226488 A | 8/2001 |

OTHER PUBLICATIONS

"Synthesis, Characterization and Thermal Properties of New Silarylene-siloxane-acetylene Polymers" authored by Wang et al. and published in the European Polymer Journal (2010) 46, 465-471.*
"Synthesis and Properties of Arylacetylene Resins with Siloxane Units" authored by Gao et al. and published in the Bulletin of the Korean Chemical Society (2010) 31 (4), 976-980.*
"Synthesis and Properties of a Novel Poly(diethynylbenzene-siloxane) Resin" authored by Wang et al. and published in High Performance Polymers (2012) 24(4), 247-253.*

* cited by examiner

*Primary Examiner* — Marc Zimmer
(74) *Attorney, Agent, or Firm* — Nath, Goldberg & Meyer; Joshua B. Goldberg

(57) ABSTRACT

A poly(siloxane-diphenylbutadiyne) exhibiting thermosetting properties, a highly tunable glass transition temperature ($T_g$), and very high thermal and thermo-oxidative stability. In one embodiment, the poly(siloxane-diphenylbutadiyne) is a poly(tetrasiloxane-diphenylbutadiyne). The present subject matter also relates to a method of synthesizing the poly(tetrasiloxane-diphenylbutadiyne).

11 Claims, 5 Drawing Sheets

THERMOSETTING POLY(SILOXANE-DIPHENYLBUTADIYNE) WITH READILY TUNABLE GLASS TRANSITION TEMPERATURE AND HIGH THERMAL STABILITY

RELATED APPLICATIONS

The present Patent application is a National Phase Application filed under 35 U.S.C. 371 as a national stage of PCT/CN2013/000359, filed Apr. 7, 2013, which claims priority to Provisional Patent Application No. 61/686,762, filed Apr. 12, 2012, by the inventors hereof and is incorporated by reference herein in its entirety.

TECHNICAL FIELD

The present subject matter is directed to a new type of poly(siloxane-diphenylbutadiyne) with thermosetting properties, readily tunable glass transition temperatures (from elastomers to plastics), and high thermal and thermo-oxidative stability.

BACKGROUND

There is an ongoing need in the aerospace industry for new high-temperature elastomers that can exhibit and retain useful mechanical, electrical, and other specific properties under extreme environmental conditions.

Polysiloxanes and their derivatives have attracted interest for use as high-temperature elastomers. The unique combination of high-temperature stability and low-temperature flexibility has prompted syntheses of many examples of these polymers containing a myriad of functional groups. Linear polymers and cross-linked polymers that have repeating units made up of diacetylene groups and siloxane groups are disclosed in, for example, U.S. Pat. No. 5,563,181 to Keller et al., U.S. Pat. No. 5,874,514 to Keller et al., and U.S. Pat. No. RE39332 to Keller et al., incorporated herein by reference. Linear polymers and cross-linked polymers and copolymers made up of silarylene and siloxane units are disclosed in, for example, U.S. Pat. No. 5,578,380 to Babu et al., U.S. SIR No. H1612 to Rhein et al., and U.S. Pat. No. 5,346,980 to Babu et al., incorporated herein by reference.

Incorporation of an aromatic unit into the siloxane backbone of polysiloxane polymers improves both mechanical and thermal properties. However, inclusion of an aromatic group increases the glass-transition temperatures for these polymers and restricts their use at extremely low temperatures.

Accordingly, there is a need for the development of a new type of polysiloxane polymer containing one or more aromatic groups that exhibits thermosetting properties, readily tunable glass transition temperatures (from elastomers to plastics), and high thermal and thermo-oxidative stability.

SUMMARY

Therefore, an object of the present subject matter is to provide a series of polymers for us as either elastomers or plastics with extreme high thermal stability and readily tunable glass transition temperature ($T_g$), in addition to cross-linking properties, which further enhances their thermal and thermo-oxidative stability.

The present subject matter is directed to a new type of siloxane-diphenylbutadiyne polymers synthesized via a new synthetic route, exhibiting thermosetting properties, readily tunable glass transition temperatures (from elastomers to plastics), and high thermal and thermo-oxidative stability.

Specifically, the present subject matter is directed to a poly(siloxane-diphenylbutadiyne) comprising the formula:

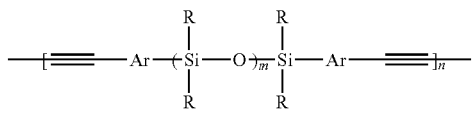

wherein m and n are integers greater than 0, n represents the number of repeating unit in the poly(siloxane-diphenylbutadiyne), Ar is an aromatic group, and each R is independently selected from the group consisting of an alkyl, aryl, alkylaryl, haloalkyl, haloaryl, and combinations thereof.

In one embodiment, the poly(siloxane-diphenylbutadiyne) is a poly(tetrasiloxane-diphenylbutadiyne) comprising the formula:

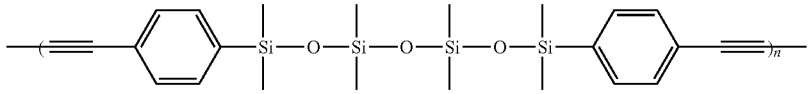

wherein n is an integer greater than 0; and wherein n represents the number of repeating units in the poly(siloxane-diphenylbutadiyne).

In another embodiment, the poly(siloxane-diphenylbutadiyne) is a thermoset polymer. In a further embodiment, the poly(tetrasiloxane-diphenylbutadiyne) has a glass transition temperature ($T_g$) that can be adjusted to make the thermoset polymer elastic or plastic.

The present subject matter also relates to a method of synthesizing the poly(tetrasiloxane-diphenylbutadiyne) comprising: (a) reacting 1-bromo-4-iodobenzene with trimethylsilylacetylene via Sonogashira reaction to produce (4-Bromophenylethynyl)trimethylsilane; (b) reacting the (4-Bromophenylethynyl)trimethylsilane of step (a) with n-butyl lithium to produce (4-lithio-phenylethynyl)trimethylsilane; (c) reacting the (4-lithio-phenylethynyl)trimethylsilane of step (b) with 1,7-dichloro-octamethyltetrasiloxane to produce bis(4-trimethylsilylethynylphenyl)octamethyltetrasiloxane; (d) reacting the bis(4-trimethylsilylethynylphenyl) octamethyltetrasiloxane of step (c) with an ammonium solution to produce bis(4-ethynylphenyl)octamethyltetrasiloxane; and (e) conducting glaser coupling polymerization of the bis(4-ethynylphenyl) octamethyltetrasiloxane of step (d) to produce poly(tetrasiloxane-diphenylbutadiyne).

BRIEF DESCRIPTION OF THE DRAWINGS

Various embodiments will be described in detail with reference to the accompanying drawings.

FIG. 1 shows the molecular mass of poly(tetrasiloxane-diphenylbutadiyne) relative to the reaction time at room temperature and 50° C. Polymerization conditions: [monomer]=0.05 M, [CuCl]=6.57 mM, [TMEDA]=18 mM.

FIG. 2 shows the molecular mass of poly(tetrasiloxane-diphenylbutadiyne) relative to the reaction time when [CuCl] is 6.57 mM and 13.1 mM. Polymerization conditions: [monomer]=0.05 M, [TMEDA]=18 mM, at room temperature.

FIG. 3 shows the molecular mass of poly(tetrasiloxane-diphenylbutadiyne) relative to the reaction time when [Monomer] is 0.05 mM and 0.1 mM. Polymerization conditions: [CuCl]=6.57 mM, [TMEDA]=18 mM, at room temperature.

FIG. 4 shows the mass % of the poly(tetrasiloxane-diphenylbutadiyne) relative to temperature.

DETAILED DESCRIPTION

Definitions

Figure 1:
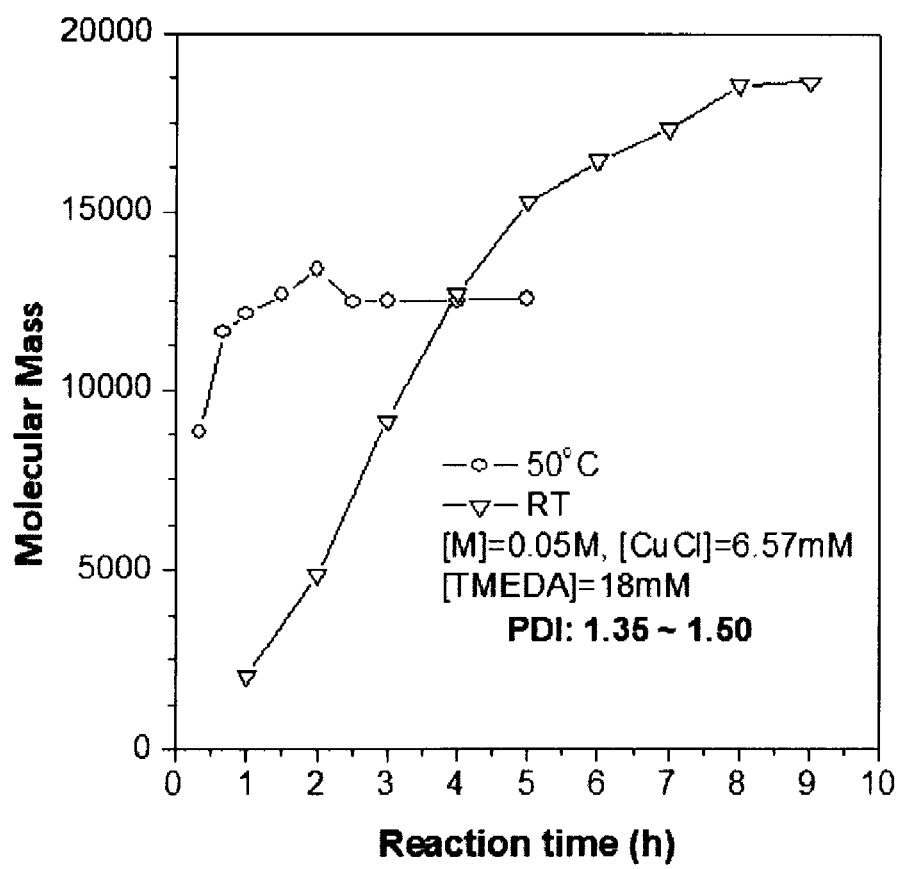
FIG. 1. illustrates the effect of different temperatures on the polymerization time and molecular mass of poly(tetrasiloxane-diphenylbutadiyne). Specifically.

All technical and scientific terms used herein have the same meanings as commonly understood by someone ordinarily skilled in the art to which the present subject matter belongs. The following definitions are provided for clarity.

The term "a" or "an" as used herein includes the singular and the plural, unless specifically stated otherwise. Therefore, the term "a," "an," or "at least one" can be used interchangeably in this application.

The term "alkyl" as used herein refers to a branched or unbranched hydrocarbon chain comprising a designated number of carbon atoms. For example, a $C_1$-$C_6$ straight or branched alkyl hydrocarbon chain contains 1 to 6 carbon atoms, and includes but is not limited to methyl, ethyl, propyl, iso-propyl, butyl, iso-butyl, tert-butyl, n-pentyl, n-hexyl, and the like. In one embodiment, the "alkyl" chain may be unsubstituted or is substituted by one or more substituents. It is also contemplated as with the scope of the present subject matter that "alkyl" may also refer to a hydrocarbon chain wherein any of the carbon atoms of the alkyl are optionally replaced with O, NH, S, or $SO_2$. For example, carbon 2 of n-pentyl can be replaced with O to form propyloxymethyl.

The term "aryl" refers to an aromatic carboxcyclic group having a single ring, for example a phenyl ring; multiple rings, for example biphenyl; or multiple condensed rings in which at least one ring is aromatic, for example naphthyl, 1,2,3,4-tetrahydronaphthyl, anthrl, or phenanthryl, which can be unsubstituted or substituted with one or more other substituents.

The term "DCM" as used herein refers to dichloromethane or methylene chloride, a common organic solvent.

The term "DSC" as used herein refers to differential scanning calorimetry or the differential scanning calorimeter. Differential scanning calorimetry is a thermoanalytical technique in which the difference in the amount of heat required to increase the temperature of a sample and reference is measured as a function of temperature.

The term "elastomer" as used herein refers to a polymer with viscoelasticity. An elastomer includes both thermoset and thermoplastic elastomers.

The phrase "glass transition temperature ($T_g$)" as used herein refers to the temperature at which the Gibbs free energy is such that the activation energy for the cooperative movement of 50 or so elements of the polymer is exceeded. Therefore, the introduction of relatively stiff chemical groups (such as benzene rings) will typically interfere with the flowing process and hence increase $T_g$.

The term "o-DCB" as used herein refers to 1,2-dichlorobenzene or ortho-dichlorobenzene.

The term "TGA" as used herein refers to thermogravimetric analysis or thermal gravimetric analysis, which is a method of thermal analysis in which changes in physical and chemical properties of materials are measured as a function of increasing temperature (with constant heating rate), or as a function of time (with constant temperature and/or constant mass loss).

The phrase "thermosetting elastomer" as used herein refers to a prepolymer in a soft solid or viscous state that changes irreversibly into an infusible, insoluble polymer network by curing.

The phrase "thermoplastic elastomer" as used herein refers to a polymer that becomes pliable or moldable above a specific temperature, and returns to a solid state upon cooling.

The term "TMEDA" as used herein refers to tetramethylethylenediamine, a chemical compound with the formula $(CH_3)_2NCH_2CH_2N(CH_3)_2$. TMEDA is commonly used as a ligand for metal ions.

The term "TMS" as used herein refers to tetramethylsilane, an organosilicon compound with the formula $Si(CH_3)_4$.

Throughout the application, descriptions of various embodiments use the term "comprising;" however, it will be understood by one of skill in the art, that in some specific instances, an embodiment can alternatively be described using the language "consisting essentially of" or "consisting of."

For the purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The following detailed description of the subject matter is provided to aid those skilled in the art in practicing the present subject matter. However, the following detailed description of the subject matter should not be constructed to unduly limit the present subject matter. Variations and modifications in the embodiments discussed may be made by these of ordinary skill in the art without departing from the scope of the present subject matter.

The present subject matter relates to a new type of poly(siloxane-diphenylbutadiyne) which is represented by the following chemical formula:

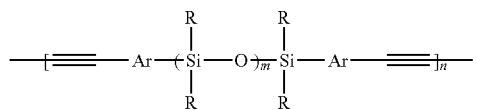

wherein m and n are integers greater than 0, n represents the number of repeating units in the poly(siloxane-diphenylbutadiyne), Ar is an aromatic group, and each R is independently selected from the group consisting of an alkyl, aryl, alkylaryl, haloalkyl, haloaryl, and combinations thereof. In one embodiment, each R is independently selected from the group consisting of an alkyl, aryl, alkylaryl, haloalkyl, and haloaryl. In another embodiment, each R is the same. For example, each R can be $CH_3$.

Different embodiments of the elastomers and plastics with good thermo-oxidative stability made by these poly(siloxane-diphenylbutadiyne)s can be obtained through different selections of m, n, Ar, and R. For example, increasing m (the number of siloxanes) increases the polymer chain flexibility and thus lowers $T_g$. Using large and rigid Ar groups can enhance the thermal and thermo-oxidative stability while also making the polymer chain more rigid. Increasing the molecular mass (n) results in increased $T_g$ and decomposition temperature. Likewise, increasing the $T_g$ and decomposition temperature results in increased molecular mass. Use of bulky R side groups can enhance the solubility of the polymers in common solvents but may decrease the thermo-oxidative stability.

In one embodiment, Ar is a phenylene. In another embodiment, R is a methyl group, $CH_3$. In a further embodiment, m is 3. The present subject matter also relates to the poly(siloxane-diphenylbutadiyne) as a thermoset polymer.

In one embodiment of the poly(siloxane-diphenylbutadiyne)s, m is 3 and Ar is a phenyl ring. This embodiment was synthesized via the following reaction scheme:

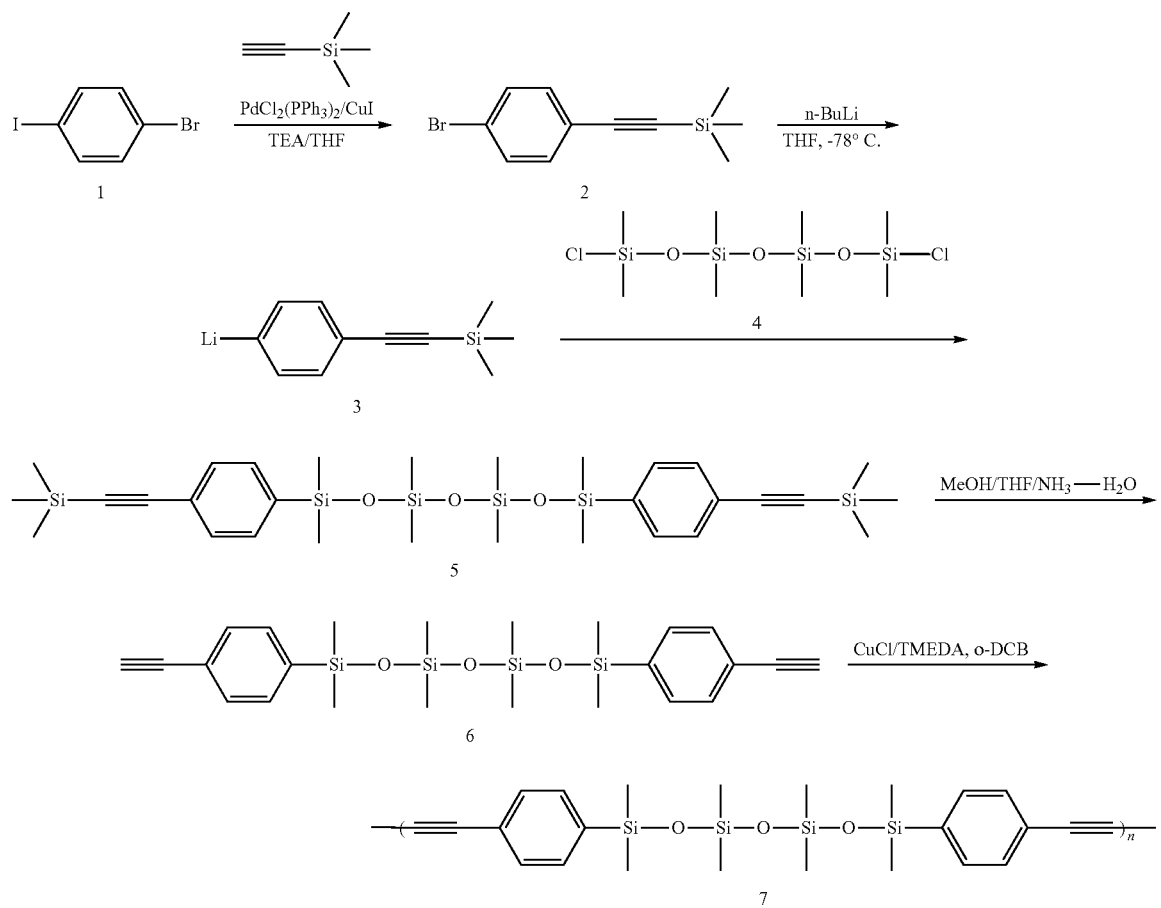

Since a phenyl side group of the siloxane unit greatly enhances the stiffness of the polymer chain, the present subject matter is also related to the synthesis of silarylene-methyl siloxane diyne monomers.

As shown in the below examples, the resultant poly(tetrasiloxane-diphenylbutadiyne) is a soft light yellow solid. The resultant poly(tetrasiloxane-diphenylbutadiyne) exhibits tunable $T_g$, good thermosetting ability, and very high thermal stability, which indicate the poly(tetrasiloxane-diphenylbutadiyne)s can be effectively used as high-temperature elastomers and plastics.

Accordingly, in a further embodiment, the poly(siloxane-diphenylbutadiyne) is a poly(tetrasiloxane-diphenylbutadiyne) comprising the formula:

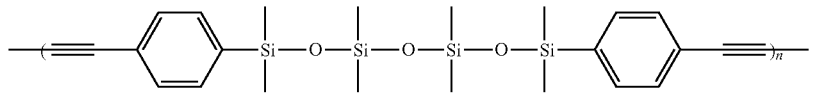

wherein n is an integer greater than 0; and wherein n represents the number of repeating units in the poly(siloxane-diphenylbutadiyne). In one embodiment, the poly(tetrasiloxane-diphenylbutadiyne) is used as a high-temperature elastomer. In a related embodiment, the glass transition temperature ($T_g$) of the poly(tetrasiloxane-diphenylbutadiyne) can be adjusted to make the thermoset polymer elastic or plastic.

In a further embodiment, the poly(tetrasiloxane-diphenylbutadiyne)s have high thermal and thermo-oxidative stability. Furthermore, the thermal and thermo-oxidative stability are enhanced by cross-linking of the terminal triple bonds in the poly(tetrasiloxane-diphenylbutadiyne) polymer chain, and then further cross-linking of the internal diacetylene units at a higher temperature. In addition, the poly(tetrasiloxane-diphenylbutadiyne)s can possess thermosetting features, including self-cross-linking, out-gas free, and minimal shrinkage.

The present subject matter also relates to a method of synthesizing the poly(tetrasiloxane-diphenylbutadiyne) comprising: (a) reacting 1-bromo-4-iodobenzene with trimethylsilylacetylene via Sonogashira reaction to produce (4-Bromophenylethynyl)trimethylsilane; (b) reacting the (4-Bromophenylethynyl)trimethylsilane of step (a) with n-butyl lithium to produce (4-lithio-phenylethynyl)trimethylsilane; (c) reacting the (4-lithio-phenylethynyl)trimethylsilane of step (b) with 1,7-dichloro-octamethyltetrasiloxane to produce bis(4-trimethylsilylethynylphenyl)octamethyltetrasiloxane; (d) reacting the bis(4-trimethylsilylethynylphenyl)octamethyltetrasiloxane of step (c) with an ammonium solution to produce bis(4-ethynylphenyl)octamethyltetrasiloxane; and (e) conducting glaser coupling polymerization of the bis(4-ethynylphenyl)octamethyltetrasiloxane of step (d) to produce poly(tetrasiloxane-diphenylbutadiyne).

Furthermore, the poly(tetrasiloxane-diphenylbutadiyne) has a molecular mass that can be readily tuned by controlling the reaction time, reaction temperature, and catalyst and monomer concentrations.

EXAMPLES

Having described the subject matter, the following examples are given to illustrate various embodiments and specific applications of the present subject matter. These specific examples are not intended to limit the scope of the subject matter described in this application.

Example 1

Synthesis of (4-Bromophenylethynyl)trimethylsilane 1-bromo-4-iodobenzene was reacted with trimethylsilylacetylene via Sonogashira coupling reaction under the $PdCl_2(PPh_3)_2$/CuI/TEA catalyst system to produce (4-bromophenylethynyl)trimethylsilane as a white solid, quantitatively. Specifically, 11.32 g (40 mmol) of 1-bromo-4-iodobenzene was placed in a round bottomed flask equipped with a septum and a stirring bar. The flask was put into a glove box and 281 mg (0.4 mmol) of dichlorobis-(triphenylphosphine)palladium(II) and 19 mg (0.1 mmol) of CuI were added. Afterward, 100 mL of dried triethylamine and 5.65 mL (40 mmol) of trimethylsilylacetylene were injected into the flask through syringes while stirring. The mixture was stirred at room temperature for 2 h. Precipitates were formed. The precipitates were filtered and washed with diethyl ether. The solutions were combined and the solvent was evaporated. The crude product was purified by a silica gel column chromatography using hexane as eluent. A white powdery product was obtained in 97% yield (9.82 g).

$^1$H NMR (300 MHz, $CDCl_3$), δ (TMS, ppm): 7.42 (d, 2H, Ar—H ortho to Br), 7.31 (d, 2H, Ar—H meta to Br), 0.24 (s, 9H, Si—$CH_3$). $^{13}$C NMR (75 MHz, $CDCl_3$), δ (ppm): 133.2 (aromatic carbon meta to Br), 131.3 (aromatic carbon ortho to Br), 122.6 (aromatic carbon linked with Br), 122.0 (aromatic carbon para to Br), 103.8 (acetylenic carbon linked with aromatic ring), 95.5 (acetylenic carbon linked with Si), 0.01 (Si—$CH_3$).

Example 2

Synthesis of Bis-(4-trimethylsilylethynylphenyl)-octamethyltetrasiloxane (4-bromophenylethynyl)trimethylsilane was treated with n-butyl lithium under dry-ice bath to produce 4-((trimethylsilyl)ethynyl)phenyl)lithium, which was reacted with 1,7-dichloro-octamethyltetrasiloxane to produce bis-(4-trimethylsilylethynylphenyl)-octamethyltetrasiloxane, a colorless liquid in 79% yield.

Specifically, 2.53 g (10.0 mmol) of (4-Bromophenylethynyl)trimethylsilane and 100 mL of tetrahydrofuran (THF) were placed in a nitrogen flushed, round-bottomed flask equipped with a septum and a stirring bar. The flask was cooled at −78° C. 4.2 mL of 2.5 M (10.5 mmol) n-butyllithium in hexane was added dropwise during vigorous stirring. After stirring at −78° C. for 2 h, 1.74 mL (5.0 mmol) of 1,7-Dichloro-octamethyltetrasiloxane was added dropwise. The mixture was then warmed to room temperature, and stirred overnight. After solvent evaporation, the colorless liquid was dissolved in dichloromethane (DCM) and washed with water three times. The organic layers were combined. After removal of the solvent, bis-(4-trimethylsilylethynylphenyl)-octamethyltetrasiloxane was obtained in a 79% yield by running through a silica column with hexane/DCM (10:1) as eluent.

$^1$H NMR (300 MHz, $CDCl_3$), δ (TMS, ppm): 7.49 (m, 4H, Ar—H), 7.45 (m, 4H, Ar—H), 0.33 (s, 12H, methyl group of Si in -Ph-Si($CH_3$)$_2$—O—), 0.24 (s, 18H, trimethylsilyl), 0.04 (s, 12H, methyl group of Si in —O—Si($CH_3$)$_2$—O—). $^{13}$C NMR (75 MHz, $CDCl_3$), δ (ppm): 137.6 (aromatic carbon linked with Si), 135.2 (aromatic carbon ortho to Si), 131.6 (aromatic carbon meta to Si), 123.2 (aromatic carbon para to Si), 104.7 (acetylenic carbon linked with aromatic ring), 98.7 (acetylenic carbon linked with TMS), 3.2 (methyl carbon in -Ph-Si($CH_3$)$_2$—O—), 1.2 (—Si($CH_3$)$_3$), 0.5 (methyl carbon in —O—Si($CH_3$)$_2$—O—).

Example 3

Synthesis of Bis-(4-ethynylphenyl)-octamethyltetrasiloxane

Tetramethylsilane (TMS) was deprotonated through a reaction with an ammonia solution to produce the target monomer bis-(4-ethynylphenyl)-octamethyltetrasiloxane. Specifically, 1.00 g bis-(4-trimethylsilylethynylphenyl)-octamethyltetrasiloxane in MeOH/THF/NH$_3$—H$_2$O mixture (generally 1:1:1, but sometimes it is necessary to adjust MeOH/THF ratio to obtain transparent reaction mixture) was placed in a round-bottomed flask equipped with a magnetic stirring bar. The flask was placed in an ice-water bath and stirred for 24 h (monitored by TLC). Then, the reaction was stopped, and the mixture was extracted via DCM and water. After removing the solvent of the organic layer, Bis-(4-ethynylphenyl)-octamethyltetrasiloxane was obtained in a 61% yield as a light yellow liquid by running silica column with hexane/DCM (10:1) as eluent.

$^1$H NMR (300 MHz, CDCl$_3$), δ (TMS, ppm): 7.49 (m, 4H, Ar—H), 7.45 (m, 4H, Ar—H), 3.10 (terminal alkyne proton), 0.33 (s, 12H, -Ph-Si(CH$_3$)$_2$—O—), 0.04 (s, 12H, methyl group of Si in methyl group of Si in —O—Si(CH$_3$)$_2$—O—). $^{13}$C NMR (75 MHz, CDCl$_3$), δ (ppm): 137.6 (aromatic carbon linked with Si), 135.2 (aromatic carbon ortho to Si), 131.6 (aromatic carbon meta to Si), 123.2 (aromatic carbon para to Si), 84.0 (acetylenic carbon linked with aromatic ring), 78.2 (acetylenic carbon linked with H), 3.2 (methyl carbon in -Ph-Si(CH$_3$)$_2$—O—), 0.5 (—O—Si(CH$_3$)$_2$—O—).

Example 4

Synthesis of Poly(tetrasiloxane-diphenylbutadiyne)

Oxidative polycoupling of bis(4-ethynylphenyl)-octamethyltetrasiloxane was conducted by using a CuI/TMEDA catalyst and pumping air. A typical procedure for the polycoupling is given below as an example.

1.2 mg (0.012 mmol) CuCl and 4 mg (0.036 mmol) TMEDA in 1 mL o-DCB were placed in a 20 mL test tube equipped with a magnetic stirrer. The catalyst system was aged for 20 min. with pumping air. The monomer (48.3 mg, 0.1 mmol) was dissolved in 1 mL o-DCB and then added into the catalyst mixture. After stirring at room temperature for 2 h with pumping air, the polymerization was stopped by passing the reaction mixture through neutral alumina oxide column to remove the Cu catalyst, then pouring it into 100 mL of methanol. The resultant emulsion was centrifuged to produce a light brown soft solid, and dried in vacuum for 24 h at room temperature.

Figure 2:
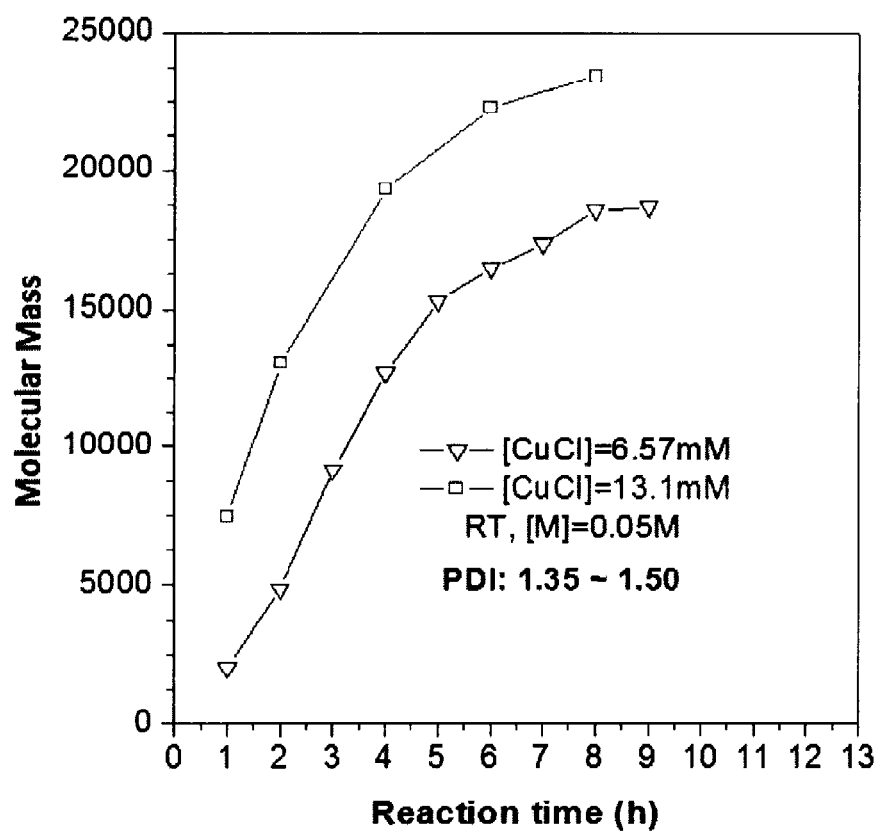
FIG. 2. Illustrates effect of catalyst concentration on the polymerization time and molecular mass of poly(tetrasiloxane-diphenylbutadiyne). Specifically.
Figure 3:
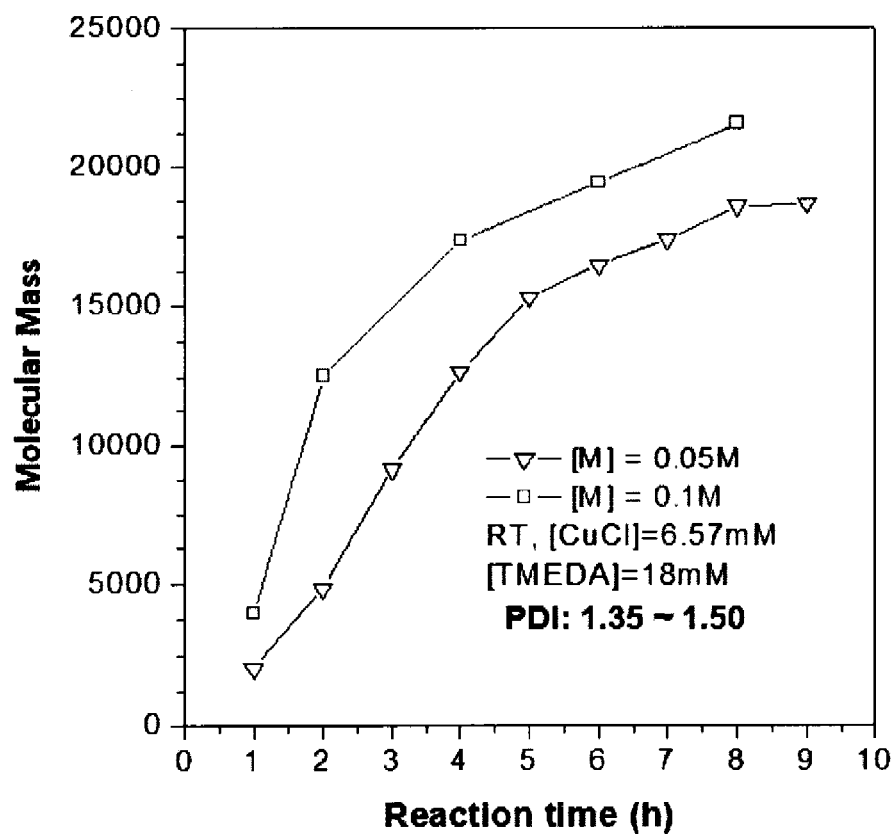
FIG. 3. illustrates the effect of monomer concentration on the polymerization time and molecular mass of poly(tetrasiloxane-diphenylbutadiyne). Specifically.

$^1$H NMR (400 MHz, CDCl$_3$), δ (ppm): 7.6-7.5 (Ar—H), 0.33 (methyl group of Si in -Ph-Si(CH$_3$)$_2$—O—), 0.05 (methyl group of Si in —O—Si(CH$_3$)$_2$—O—). $^{13}$C NMR (75 MHz, CDCl$_3$), δ (ppm): 133.6, 132.2, 82.7, 82.5, 77.8, 75.2, 3.2, 0.5. Polymers with varied molecular mass can be produced by controlling reaction temperature, reaction time, catalyst concentration and monomer concentration as discussed in the following Examples 5 to 7 (FIGS. 1 to 3).

Example 5

Temperature Effect in the Synthesis of Poly(Tetrasiloxane-Diphenylbutadiyne)

The polycoupling was conducted via similar procedures as shown in Example 4 at room temperature and 50° C., respectively. About 0.05 mL reaction mixtures were taken out by syringes at different time slots, passing through a small neutral alumina oxide column to remove the catalyst by using 2 mL THF as eluent. Relative average molecular mass and polydispersity index (Mm/Mn) of the resultant polymers were determined by gel permeation chromatography (GPC) in THF on the basis of linear polystyrenes calibration. As shown in FIG. 1, a higher reaction temperature resulted in a higher polymerization rate and only minimal degradation in prolonged reaction times. However, a higher reaction temperature also resulted in a relatively lower molecular mass (up to 13364). Meanwhile, the polycoupling conducted at room temperature resulted in polymers with a higher molecular mass (up to 18653), but the polymerization reaction took a longer time to complete (around 8 h) (FIG. 1).

Example 6

Catalyst Concentration Effect in the Synthesis of Poly(Tetrasiloxane-Diphenylbutadiyne)

The polycoupling was conducted via similar procedures as shown in Example 4 at room temperature with different catalyst concentrations ([CuCl]=6.57 mM, [TMEDA]=18 mM, and [CuCl]=13.1 mM, [TMEDA]=36 mM). The same purification and molecular mass measurements as discussed in Example 5 were conducted. As shown in FIG. 2, a higher catalyst concentration ([CuCl]=13.1 mM) resulted in a higher polymerization rate and a higher molecular mass (up to 23438).

Example 7

Monomer Concentration Effect in the Synthesis of Poly(Tetrasiloxane-Diphenylbutadiyne)

The polycoupling was conducted via similar procedures as shown in Example 4 at room temperature with different monomer concentrations (0.05 M and 0.1 M, respectively). The same purification and molecular mass measurements as discussed in Example 5 were conducted. As shown in FIG. 3, a higher monomer concentration ([Monomer]=0.1M) resulted in a higher molecular mass (up to 21596) and a higher polymerization rate.

Example 8

Thermal Stability Study on Poly(Tetrasiloxane-Diphenylbutadiyne) (Molecular Mass=8465)

4.3620 mg of poly(tetrasiloxane-diphenylbutadiyne) (molecular mass=8465) was placed into a platinum thermogravimetric analyzer pan. The sample was then heated at standard atmospheric pressure and at temperatures ranging from room temperature to 800° C. at a low heating rate of 10° C./min. The polymer started to decompose at around 400° C., with only 3% mass loss at 466° C., and 42 mass % residue in the end, demonstrating very good thermo-oxidative stability.

Example 9

Thermal Stability Study on Poly(Tetrasiloxane-Diphenylbutadiyne) (Molecular Mass=15137)

Figure 4:
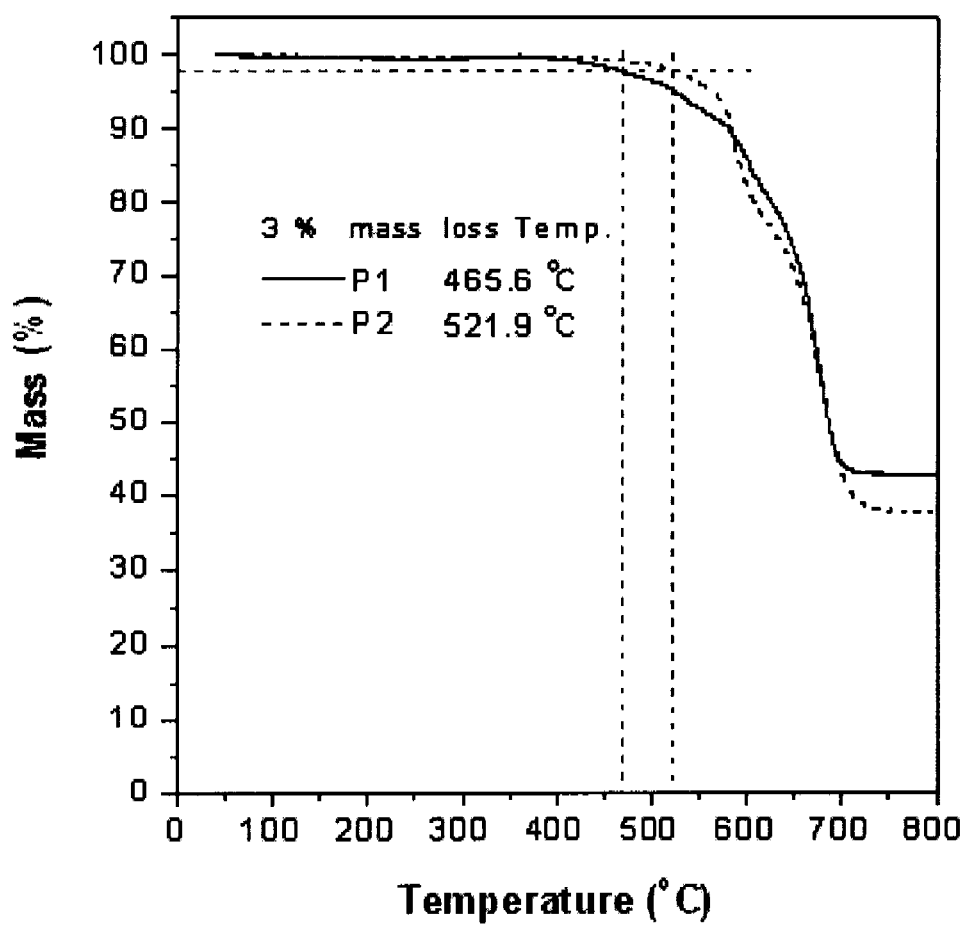
FIG. 4 illustrates the decomposition characteristics of poly(tetrasiloxane-diphenylbutadiyne) obtained from thermogravimetric analysis. Specifically.

3.9452 mg of poly(tetrasiloxane-diphenylbutadiyne) (molecular mass=15137) was placed into a platinum thermogravimetric analyzer pan. The sample was then heated at standard atmospheric pressure at a temperature ranging from room temperature to 800° C. at a low heating rate of 10° C./min. As shown in FIG. 4, the polymer started to decompose at around 400° C., with only 3% mass loss at 522° C., and 37 mass % residue in the end, demonstrating even better thermo-oxidative stability in comparison to lower molecular mass polymers, as described in Example 8. Therefore, the thermo-oxidative stability of the poly(tetrasiloxane-diphenylbutadiyne) can be tuned by adjusting its molecular mass, and even better thermal stability is achieved when the molecular mass is higher.

Example 10

DSC Thermograms Study on Poly(Tetrasiloxane-Diphenylbutadiyne)

Figure 5:
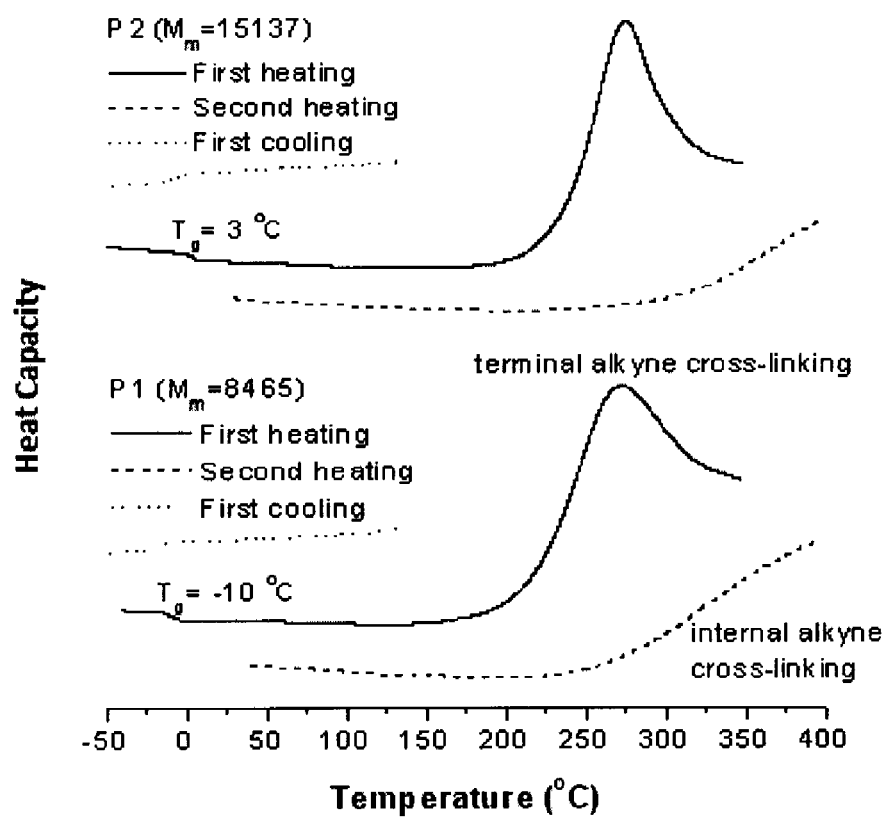
FIG. 5 illustrates the glass transition temperatures ($T_g$) and exothermic peaks (indicating crosslinking) exhibited by poly(tetrasiloxane-diphenylbutadiyne) at a molecular mass of 8465 and 15137 obtained from Differential Scanning calorimetry (DSC) analysis.

In a pre-treatment circle for Differential Scanning calorimetry (DSC) thermogram measurement, 3.7832 mg (molecular mass=8465) and 4.0321 mg (molecular mass=15137) of poly(tetrasiloxane-diphenylbutadiyne) was gradually heated from room temperature to 130° C., then cooled down to −50° C. to obtain the first cooling thermogram. The first heating circle was conducted from −50° C. to 350° C. In the second heating circle, the sample was heated from room temperature to 400° C. All the thermograms were scanned at standard atmospheric pressure at a low heating rate of 10° C./min. As shown in FIG. 5, the first cooling and the first heating thermograms suggest that the glass transition temperatures (Tg) are −10° C. and 3° C., where the molecular mass=8465 and 15137, respectively. The strong exothermic peak at around 275° C. is attributed to the cross-linking temperature of terminal triple bonds in the polymers, and the second heating thermograms indicate that internal diacetylene in the polymer main chain can continue cross-linking when the temperature is higher than 400° C.

Accordingly, the first (275° C.) and second cross-linking temperatures (400° C.) of the poly(tetrasiloxane-diphenylbutadiyne)s correspond to the cross-link of terminal triple bonds and internal diacetylene units in the polymer chain, respectively. Furthermore, thermogravimetric analysis (TGA) indicates thermal stability is dependent on the molecular mass of the poly(tetrasiloxane-diphenylbutadiyne)s. Specifically, there was a 3 mass % decrease in the molecular mass of the poly(tetrasiloxane-diphenylbutadiyne)s at a temperature between 466° C. and 522° C. Therefore, $T_g$ of poly(tetrasiloxane-diphenylbutadiyne) can be regulated by simply controlling the molecular mass.

Example 11

Long-Time Thermo-Oxidative Stability Study on Poly(Tetrasiloxane-Diphenylbutadiyne)

The polymer thin films formed by drop casting the poly(tetrasiloxane-diphenylbutadiyne)s (molecular mass=8465 and 15137) were thermally treated in a muffle at standard atmospheric pressure at 200, 300, and 400° C. for 2 h, 4 h, and 8 h, respectively. Surprisingly, these thin films remained smooth and crack-free, with only minimal mass loss and slight color change from light yellow to brown. This demonstrates the unique thermosetting features of the poly(tetrasiloxane-diphenylbutadiyne)s including self-cross-linking, out-gas free, and minimal shrinkage. Therefore, the present poly(tetrasiloxane-diphenylbutadiyne)s are good candidates for use as high temperature adhesives, chip underfill, and sealants, etc.

As can be seen from the foregoing examples, the present subject matter is directed to a new type of poly(siloxane-diphenylbutadiyne)s with thermosetting properties, tunable glass transition temperature (from elastomers to plastics), and high thermal and thermo-oxidative stability.

With the information contained herein, various departures from precise descriptions of the present subject matter will be readily apparent to those skilled in the art to which the present subject matter pertains, without departing from the spirit and the scope of the below claims. The present subject matter is not considered limited in scope to the procedures, properties, or components defined, since the preferred embodiments and other descriptions are intended only to be illustrative of particular aspects of the presently provided subject matter. Indeed, various modifications of the described modes for carrying out the present subject matter which are obvious to those skilled in chemistry and related fields are intended to be within the scope of the following claims.

We claim:

1. A poly(siloxane-diphenylbutadiyne) comprising the formula:

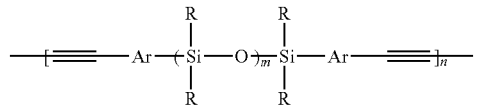

wherein:
n is an integer greater than 0,
n represents a number of repeating units in the poly(siloxane-diphenylbutadiyne),
Ar is an aromatic group,
each R is independently selected from the group consisting of an alkyl, aryl, alkylaryl, haloalkyl, haloaryl, and combinations thereof; and
wherein m is 3.

2. The poly(siloxane-diphenylbutadiyne) of claim 1, wherein Ar is a phenylene.

3. The poly(siloxane-diphenylbutadiyne) of claim 1, wherein each R is the same.

4. The poly(siloxane-diphenylbutadiyne) of claim 3, wherein each R is $CH_3$.

5. The poly(siloxane-diphenylbutadiyne) of claim 1, wherein the poly(siloxane-diphenylbutadiyne) is a poly(tetrasiloxane-diphenylbutadiyne) comprising the formula:

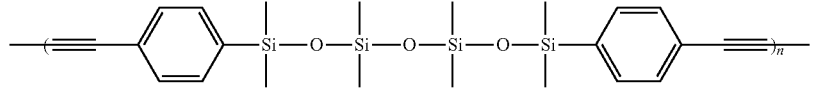

wherein n is an integer greater than 0; and wherein n represents the number of repeating units in the poly(siloxane-diphenylbutadiyne).

6. The poly(siloxane-diphenylbutadiyne) of claim 5, wherein the poly(siloxane-diphenylbutadiyne) is a thermoset polymer.

7. The poly(tetrasiloxane-diphenylbutadiyne) of claim 6, wherein the poly(tetrasiloxane-diphenylbutadiyne) has a glass transition temperature ($T_g$) that can be adjusted to make the thermoset polymer elastic or plastic.

8. The poly(tetrasiloxane-diphenylbutadiyne) of claim 6 further comprising thermosetting features, including self-cross-linking, out-gas free, and minimal shrinkage.

9. The poly(tetrasiloxane-diphenylbutadiyne) of claim 6, wherein the poly(tetrasiloxane-diphenylbutadiyne) has thermal and thermo-oxidative stability that are enhanced by cross-linking of the terminal triple bonds in the poly(tetrasiloxane-diphenylbutadiyne) polymer chain, and then cross-linking of the internal diacetylene units at a higher temperature.

10. The poly(tetrasiloxane-diphenylbutadiyne) of claim 5, wherein the poly(tetrasiloxane-diphenylbutadiyne) has a molecular mass that can be readily tuned.

11. A method of synthesizing the poly(tetrasiloxane-diphenylbutadiyne) of claim 5 comprising:

(a) reacting 1-bromo-4-iodobenzene with trimethylsilylacetylene via Sonogashira reaction to produce (4-Bromophenylethynyl)trimethylsilane;

(b) reacting the (4-Bromophenylethynyl)trimethylsilane of step (a) with n-butyl lithium to produce (4-lithio-phenylethynyl)trimethylsilane;

(c) reacting the (4-lithio-phenylethynyl)trimethylsilane of step (b) with 1,7-dichloro-octamethyltetrasiloxane to produce bis(4-trimethylsilylethynylphenyl) octamethyltetra siloxane;

(d) reacting the bis(4-trimethylsilylethynylphenyl)octamethyltetrasiloxane of step (c) with an ammonium solution to produce bis(4-ethynylphenyl) octamethyltetrasiloxane; and (e) conducting glaser coupling polymerization of the bis (4-ethynylphenyl) octamethyltetrasiloxane of step (d) to produce poly(tetrasiloxane-diphenylbutadiyne).

* * * * *